United States Patent
Wilhelm

(10) Patent No.: US 11,134,611 B2
(45) Date of Patent: Oct. 5, 2021

(54) AGRICULTURAL MACHINE WITH SKIDS EQUIPPED WITH INTERCHANGEABLE LINERS

(71) Applicant: Kuhn S.A., Saverne (FR)

(72) Inventor: Joel Wilhelm, Saint-Louis (FR)

(73) Assignee: Kuhn S.A., Saverne (FR)

( * ) Notice: Subject to any disclaimer, the term of this patent is extended or adjusted under 35 U.S.C. 154(b) by 1014 days.

(21) Appl. No.: 15/795,909

(22) Filed: Oct. 27, 2017

(65) Prior Publication Data

US 2018/0116110 A1 May 3, 2018

(30) Foreign Application Priority Data

Oct. 28, 2016 (FR) ..................................... 16 60476

(51) Int. Cl.
*A01D 34/82* (2006.01)
*A01D 34/66* (2006.01)
*A01D 101/00* (2006.01)

(52) U.S. Cl.
CPC ........... *A01D 34/82* (2013.01); *A01D 34/664* (2013.01); *A01D 34/665* (2013.01); *A01D 2101/00* (2013.01)

(58) Field of Classification Search
CPC .. A01D 2101/00; A01D 34/82; A01D 34/664; A01D 34/665; A01D 34/81; A01D 34/63; A01D 34/64; A01D 34/66–661
See application file for complete search history.

(56) References Cited

U.S. PATENT DOCUMENTS 3,058,288 A * 10/1962 Karg .................... A01D 34/135
56/297
4,157,004 A * 6/1979 van der Lely ....... A01D 34/664
56/13.6
(Continued)

FOREIGN PATENT DOCUMENTS

EP  0 223 302  5/1987
EP  0 260 750  3/1988
(Continued)

OTHER PUBLICATIONS

French Preliminary Search Report dated Apr. 4, 2017 in French Application 16 60476, filed on Oct. 28, 2016 (with English Translation of Categories of cited documents and Written Opinion).

*Primary Examiner* — Thomas B Will
*Assistant Examiner* — Joan D Misa
(74) *Attorney, Agent, or Firm* — Oblon, McClelland, Maier & Neustadt, L.L.P.

(57) ABSTRACT

An agricultural machine is with skids equipped with interchangeable liners. The agricultural machine is a disk mower, a swather or similar machine, resting at least partly in braced manner on the soil during its use and provided with a working element and with skids designed to slide on the soil. These skids are formed in a lower wall of the working element or are integral with this lower wall, and each skid is provided with a liner having at least one frontal end and a frontal rim on each side of this frontal end. At least one of the frontal rims of the liner of each skid has a relief, at least one part of which penetrates into an indentation formed in the corresponding skid.

16 Claims, 10 Drawing Sheets

(56) References Cited

U.S. PATENT DOCUMENTS

| | | | | |
|---|---|---|---|---|
| 4,201,033 A * | 5/1980 | Meek | A01D 34/30 | 56/13.6 |
| 4,231,216 A * | 11/1980 | Weber | A01D 34/664 | 56/12.6 |
| 4,426,828 A * | 1/1984 | Neuerburg | A01D 34/664 | 56/13.6 |
| 4,633,656 A * | 1/1987 | Willinger | A01D 34/664 | 56/13.6 |
| 4,679,384 A * | 7/1987 | van der Lely | A01D 34/664 | 56/12.6 |
| 4,693,062 A * | 9/1987 | van der Lely | A01D 34/664 | 56/13.6 |
| 4,727,711 A * | 3/1988 | Quataert | A01D 34/664 | 56/16.2 |
| 4,815,262 A * | 3/1989 | Koch | A01D 34/664 | 56/13.6 |
| 4,827,703 A * | 5/1989 | van der Lely | A01D 34/665 | 56/13.6 |
| 4,955,187 A * | 9/1990 | van der Lely | A01D 34/665 | 56/13.6 |
| 4,986,060 A * | 1/1991 | Walters | A01D 34/664 | 56/13.6 |
| 4,986,061 A * | 1/1991 | Frumholtz | A01D 34/664 | 56/6 |
| 5,012,635 A * | 5/1991 | Walters | A01D 34/665 | 56/13.6 |
| 5,174,101 A * | 12/1992 | Rabitsch | A01D 41/14 | 56/119 |
| 5,784,866 A * | 7/1998 | Campbell | A01D 34/665 | 56/13.6 |
| 5,809,757 A * | 9/1998 | McLean | A01D 34/665 | 56/13.6 |
| 5,875,619 A * | 3/1999 | McLean | A01D 34/665 | 56/13.6 |
| 5,907,948 A * | 6/1999 | Ellis | A01D 34/665 | 56/13.6 |
| 5,996,323 A * | 12/1999 | Campbell | A01D 34/665 | 56/13.6 |
| 6,604,347 B2 * | 8/2003 | Preipke | A01D 75/182 | 192/18 R |
| 6,675,563 B1 * | 1/2004 | Ehrhart | A01D 75/182 | 56/10.3 |
| 6,718,745 B1 * | 4/2004 | Adams | A01D 34/664 | 403/2 |
| RE40,611 E * | 12/2008 | O'Halloran | A01D 34/664 | 56/13.9 |
| RE40,614 E * | 1/2009 | Schmitt | A01D 34/667 | 56/13.9 |
| 7,661,253 B2 * | 2/2010 | Pruitt | A01D 34/665 | 56/13.6 |
| 7,730,703 B1 * | 6/2010 | Ehrhart | A01D 34/665 | 56/13.6 |
| 7,973,654 B2 * | 7/2011 | Ehrhart | A01D 34/664 | 340/441 |
| 8,020,363 B1 * | 9/2011 | Barnett | A01D 34/665 | 56/17.4 |
| 8,806,846 B2 * | 8/2014 | Hyronimus | A01D 63/00 | 56/314 |
| 9,861,036 B2 * | 1/2018 | Totten | A01D 43/107 | |
| 2009/0158699 A1 | 6/2009 | Pruitt et al. | | |
| 2016/0014963 A1 * | 1/2016 | Totten | A01D 41/141 | 56/208 |

FOREIGN PATENT DOCUMENTS

| | | | | |
|---|---|---|---|---|
| EP | 0383392 A1 * | 8/1990 | | A01D 34/664 |
| EP | 2 229 046 | 9/2010 | | |
| EP | 3315001 A1 * | 5/2018 | | A01D 34/82 |
| WO | WO 2012/034872 A1 | 3/2012 | | |

* cited by examiner

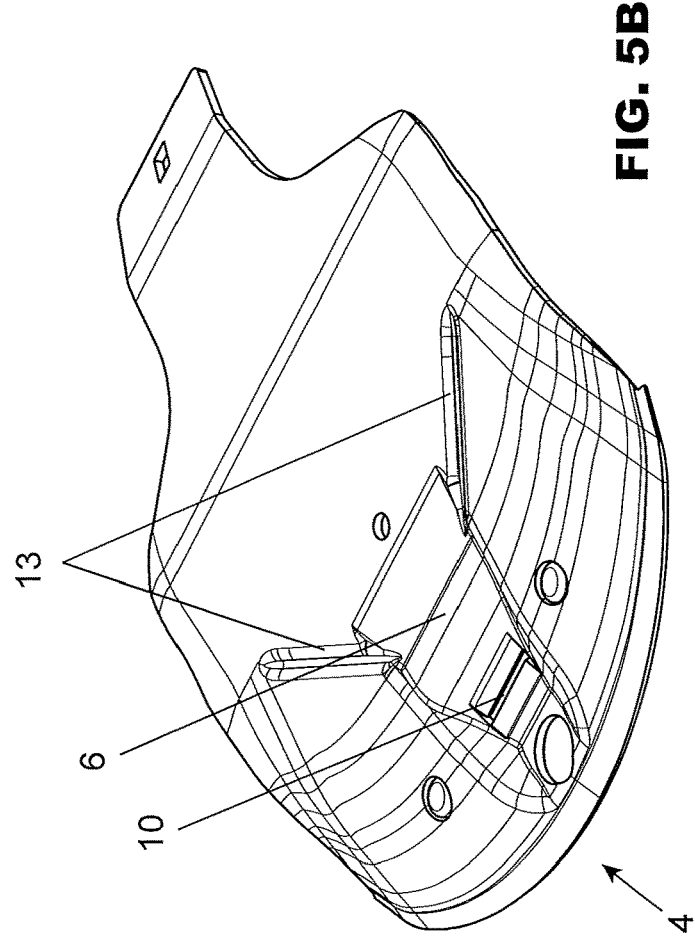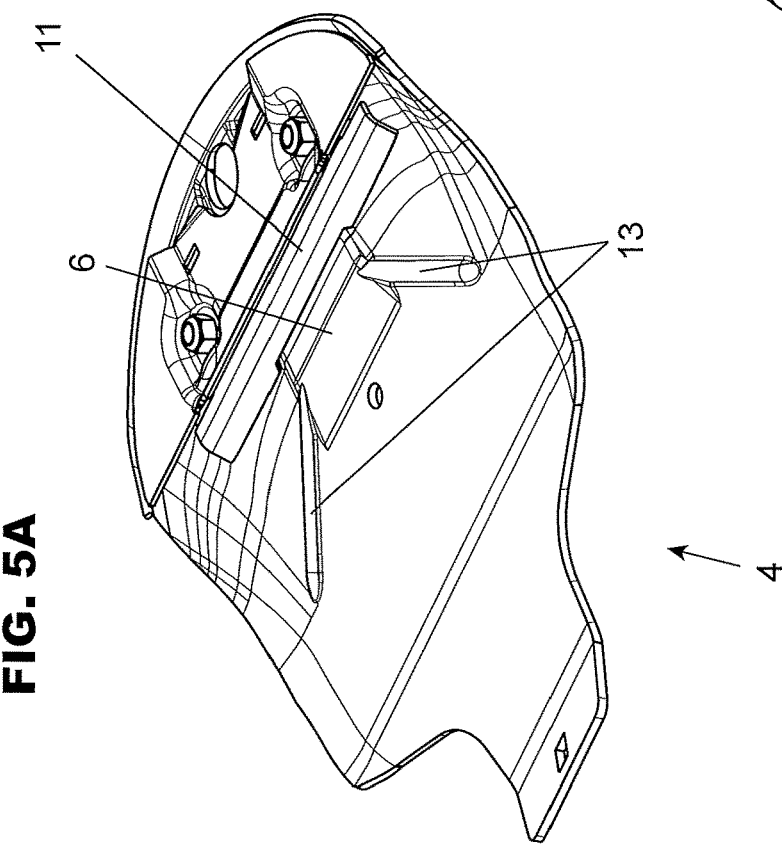

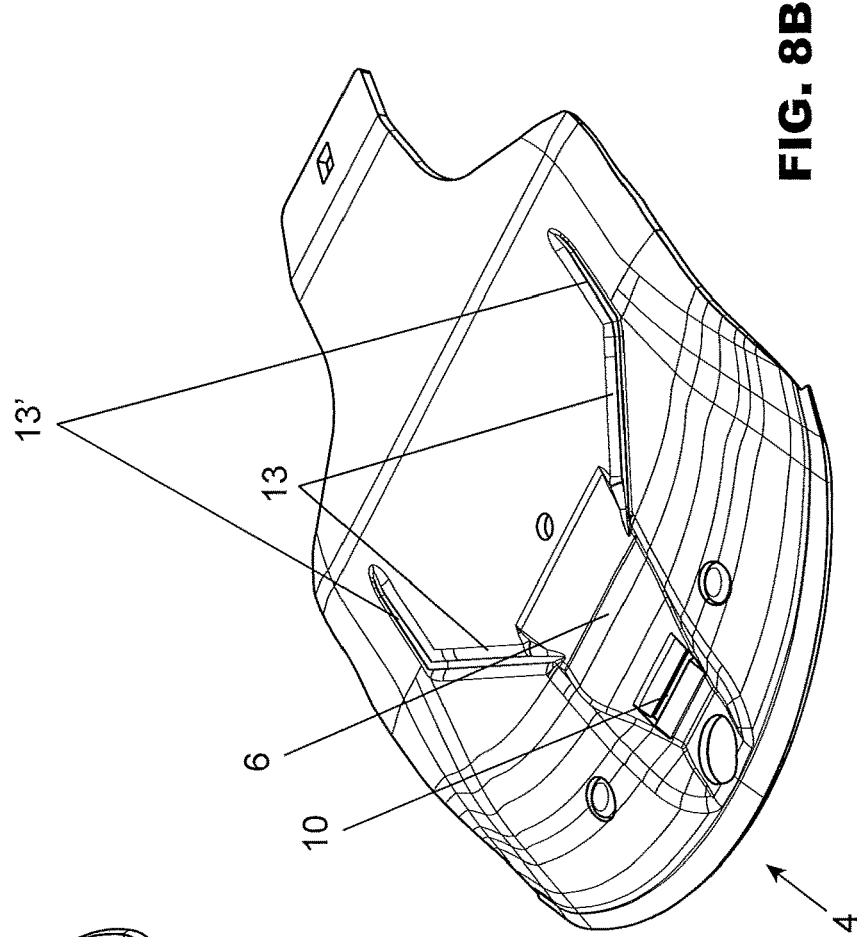
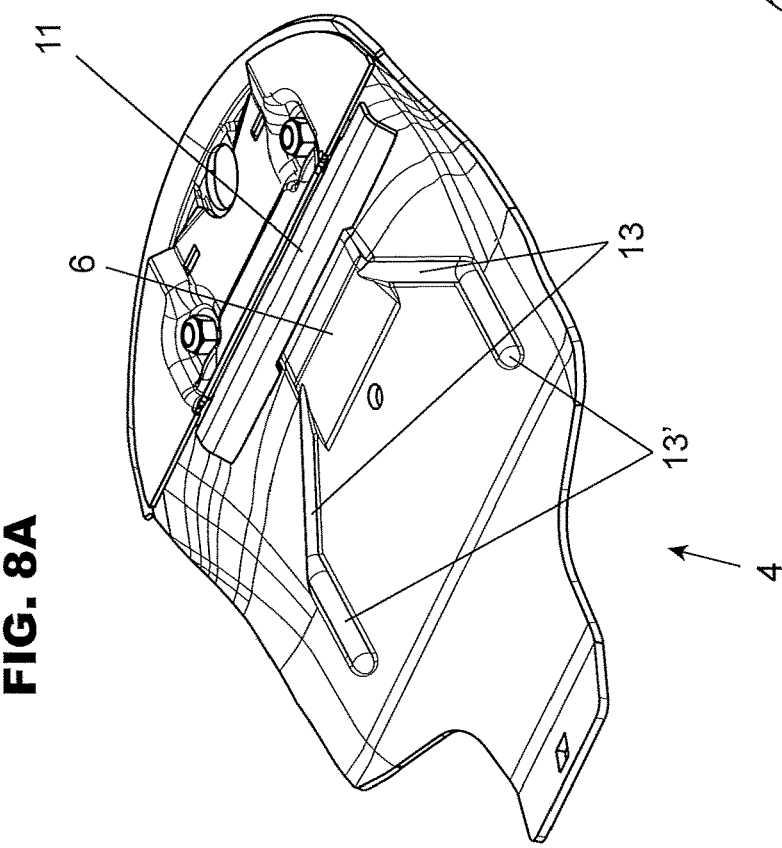

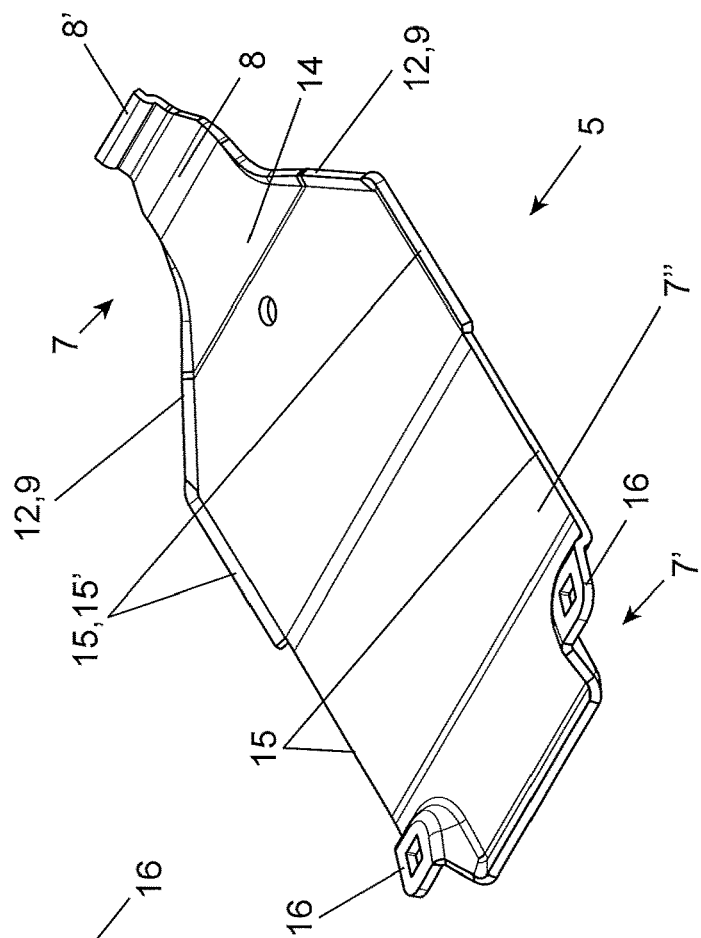
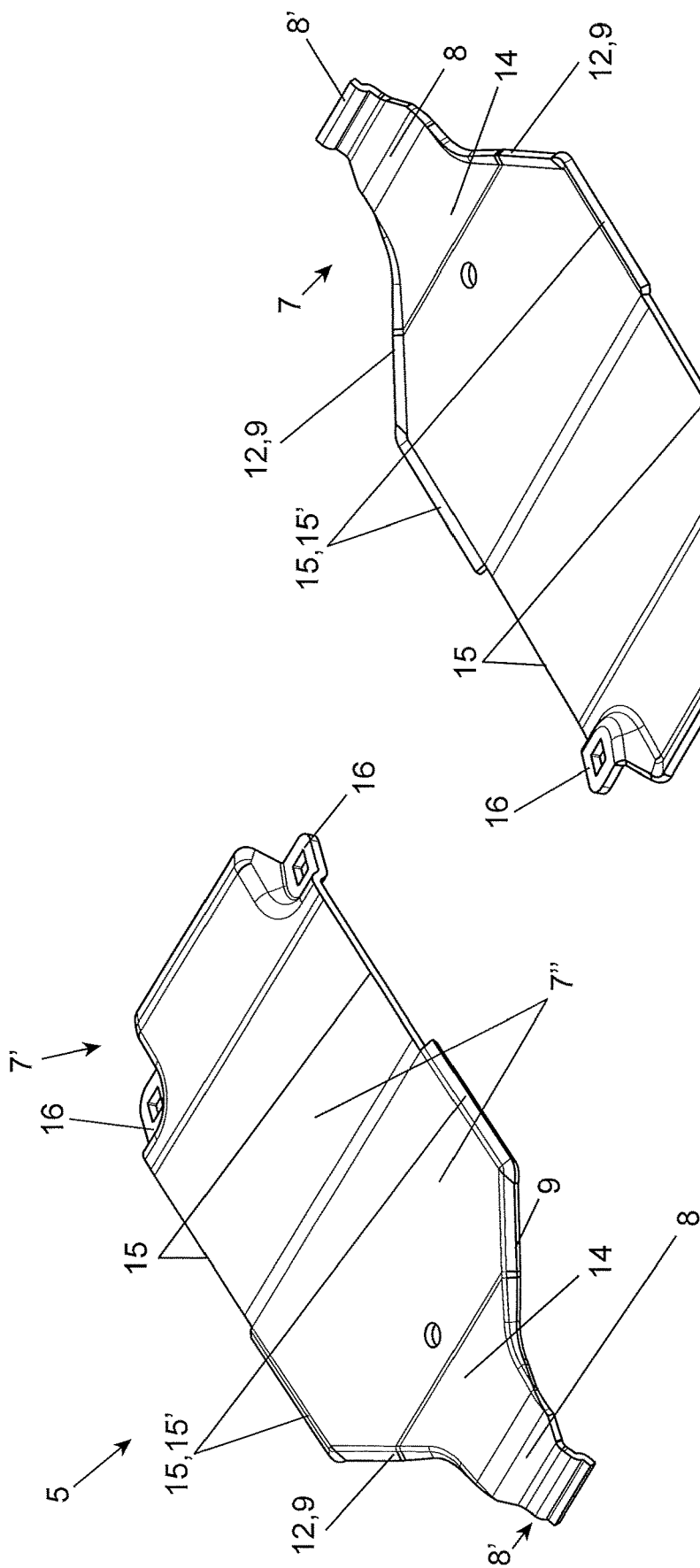
FIG. 9A
FIG. 9B

AGRICULTURAL MACHINE WITH SKIDS EQUIPPED WITH INTERCHANGEABLE LINERS

The present invention relates to the field of agricultural machinery, and particularly to machines wherein, during operation, part of the weight rests on the soil by means of skids, which in particular are disposed underneath the working tools. The invention is designed in particular to be applied to haymaking machines, such as disk mowers or swathers, but it may also envision other agricultural machines hitched to a tractor vehicle wherein at least one part is braced slidingly on the soil during their use.

Within this context, the object of the invention is an agricultural machine with skids equipped with interchangeable liners.

Several types of agricultural machines have tools, equipment units or functional means, which can be generically designated as working element, sliding on the soil during their use, wherein they are braced on the soil by way of at least one skid or at least one skid+liner assembly, and generally a plurality of such assemblies. The working element may be provided, for example, with one or more swathing rotor(s) with substantially horizontal axes, or else a cutter bar in the case of mowers.

Thus, in the case of disk mowers in particular, the cutter bar rests on the soil via a sole composed on at least one skid and optionally of at least one liner, this in order to avoid damaging the vegetation cover, to assure good following of the ground and thus to achieve good cutting quality, even on uneven ground or rolling terrain.

The skid is a component which is fixed on the cutter bar or formed in the lower wall of the casing thereof, and on which the machine rests and slides over the soil during operation. The front of the skid is designed to avoid causing spatter and to cushion the impacts with various obstacles, such as stones, which the cutter bar may encounter during its trajectory, in such a way as to protect the other components—especially the rotating elements (pinions, disks, etc.)—the replacement of which necessitates a more complicated and/or time-consuming intervention.

On the other hand, the skids make it possible to raise the cutter bar under the central part of the disks and to leave intervals between these raised positions in order to favor ground clearance under the bar, in the region of the intervals between the skids.

Such a mower equipped with skids is disclosed in particular by the document EP-A-0 360 716.

Under certain mowing conditions and on certain types of ground, the skids wear very rapidly.

Because of this fact, most manufacturers and designers have already proposed, in the prior art, liners that are to be fixed under the skids and that can be replaced more easily than the said skids.

In order to preserve the vegetation cover and to reduce the wear of the skids or liners, it is preferable to distribute the weight of the machine as much as possible by providing the largest possible surface of contact with the soil. Depending on the spreading angle (angle between the plane containing the cutting edges of the disks and the plane of the soil, in side view), the zone of bracing of the skids is more or less offset in the direction of forward travel during normal use of the machine. Thus it is preferable to dispose skids and liners that are as broad as possible, including those at the front.

Taking the convex shape of the skids into consideration (in front view), it is easier to achieve assembly of the front of a liner with the corresponding skid in the middle of thereof. Advantageously, the front part of the liner may then be straighter. On the other hand, this permits a weight savings.

From the document U.S. Pat. No. 5,784,866, it is also known from the prior art that the skids can be provided with demountable liners and have frontal rims on both sides of a frontal end, wherein these frontal rims form a V, the apex of which is directed in the direction of forward travel during use of the machine. Such a construction makes it possible to guide the earth and the debris toward the rear.

Once the liner has been assembled with the skid, these frontal rims are located between the soil and the skid, in which case they form, in places, an abrupt step or raised serration on the bottom profile of the bar.

This shoulder-shaped relief has the disadvantage of catching onto and retaining the earth, the vegetation and other debris, thus causing deterioration of the vegetation cover. In addition, the heaps formed in this way are able to become so large under certain conditions that they encroach on the overcut zone, thus detracting from the cutting quality even more. Finally, the earth and the debris heaped in this way under the cutter bar are under pressure and are able to slide between the liner and the skid, with a tendency to separate them. This separating force may become large enough to tear away the liner and severely damage the cutter bar.

It is also known in the prior art, and more particularly from the disk mowers of the Applicant known by the designation "Optidisc" (registered mark), that a liner with frontal rims forming a V (apex pointing in the direction of forward travel during use) can be fixed by welding to the underside of the skid. Nevertheless, the interchangeability of this liner is problematic and has a certain resistance to forward travel as well as a tendency to catch onto earth and debris, which remain on the underside of the skid because of the projecting edge constituted by the attached liner.

The purpose of the present invention is to overcome the aforesaid main disadvantages and more particularly consists of providing an agricultural machine of the aforesaid type, wherein the liners protecting the skids prevent the accumulation of earth, vegetation or other debris in the region of their frontal rim and, as the case may be, effectively assure guided evacuation of the earth and debris toward the rear, and do so simply and inexpensively, while advantageously offering easy interchangeability.

To this effect, the object of the invention is an agricultural machine such as a disk mower, a swather or similar machine, resting at least partly in braced manner on the soil during its use and provided with a working element and with skids designed to slide on the soil, wherein these skids are formed in a lower wall of the said working element or are integral with this lower wall, and each skid is provided with a liner having at least one frontal end and a frontal rim on each side of this frontal end, which agricultural machine is characterized in that at least one of the frontal rims of the liner of each skid has a relief, at least one part of which penetrates into an indentation formed in the corresponding skid.

The invention will be better understood by virtue of the description hereinafter, which relates to preferred embodiments, provided by way of non-limitative examples, and will be explained with reference to the attached schematic drawings, wherein:

FIGS. 5A and 5B are views in perspective, from above and from below respectively, of a skid (isolated) represented in FIGS. 1, 2, 3 and 4;

FIGS. 8A and 8B are views in perspective, from above and from below respectively, of a skid according to another alternative embodiment of the invention;

Figure 10A:
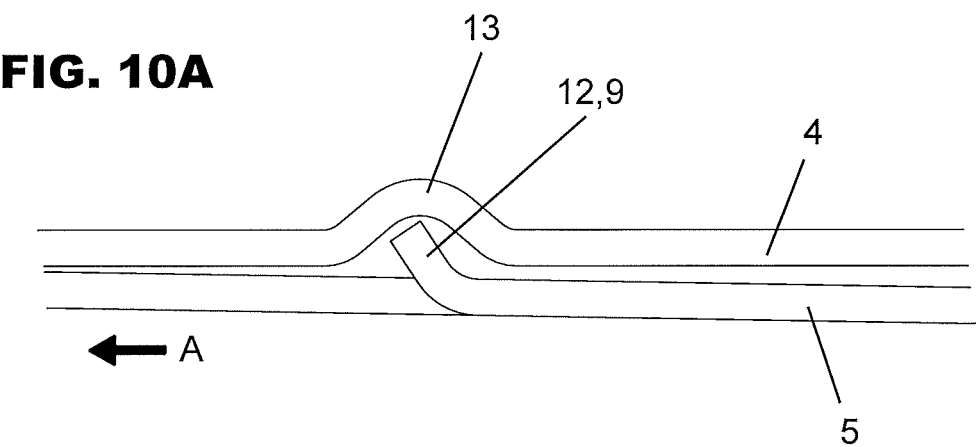
Figure 10B:
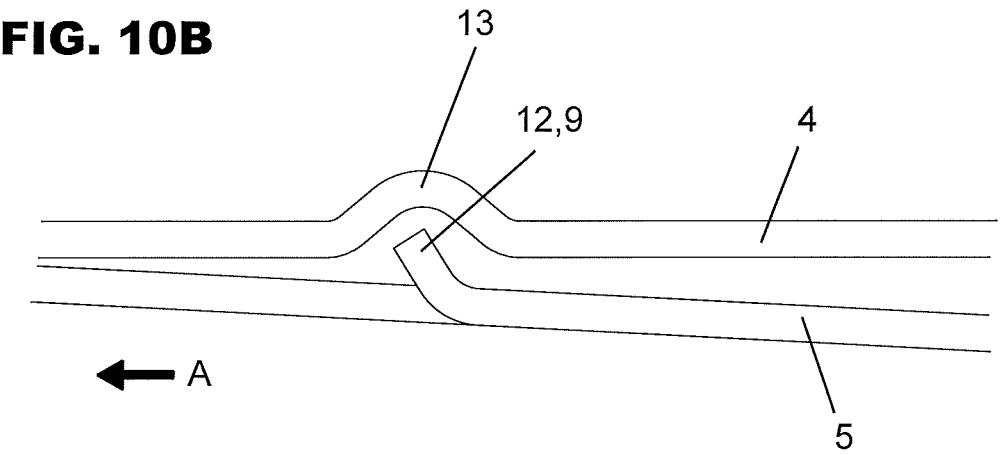

FIGS. 9A and 9B are views in perspective, from below and from above respectively (similar to the views of FIGS. 6A and 6B), of a liner according to an alternative embodiment of the invention and adapted for mounting on the skid represented in FIGS. 8A and 8B; and FIGS. 10A and 10B are detail views in section, partly along B-B, of the object represented in FIG. 1 according to two different embodiments.

On FIGS. 5, 6, 8 and 9, representations of curves of lighter weight than the visible ridges, also referred to as imaginary ridges, are drawn for information, in order to improve the visualization of the components.

Figure 1:
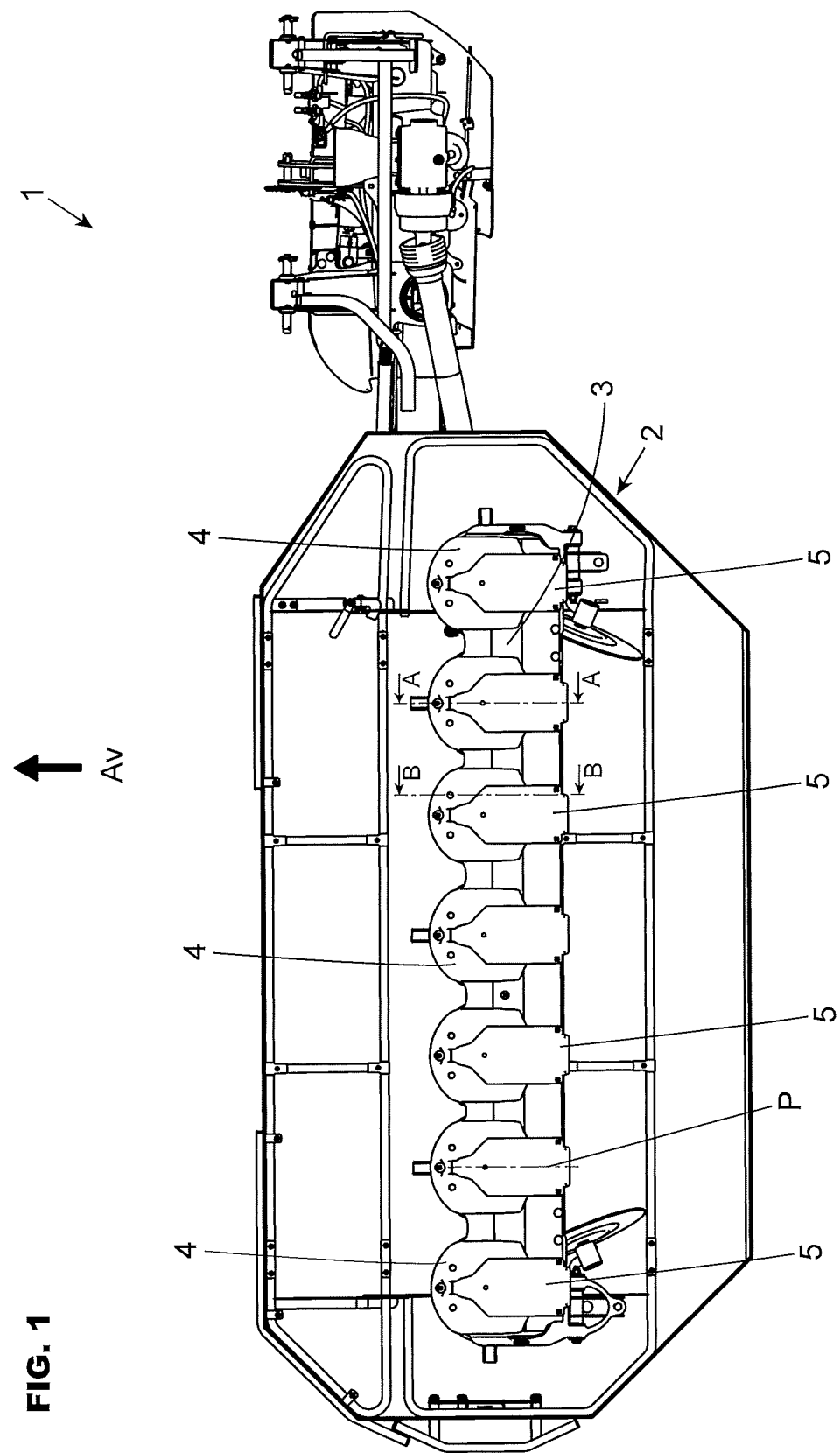
FIG. 1 is a schematic representation, in a view from below, of an agricultural machine according to the invention, of the disk-mower type, comprising a working element in the form of cutter bar provided with protected skids according to a first alternative embodiment.
Figure 2:
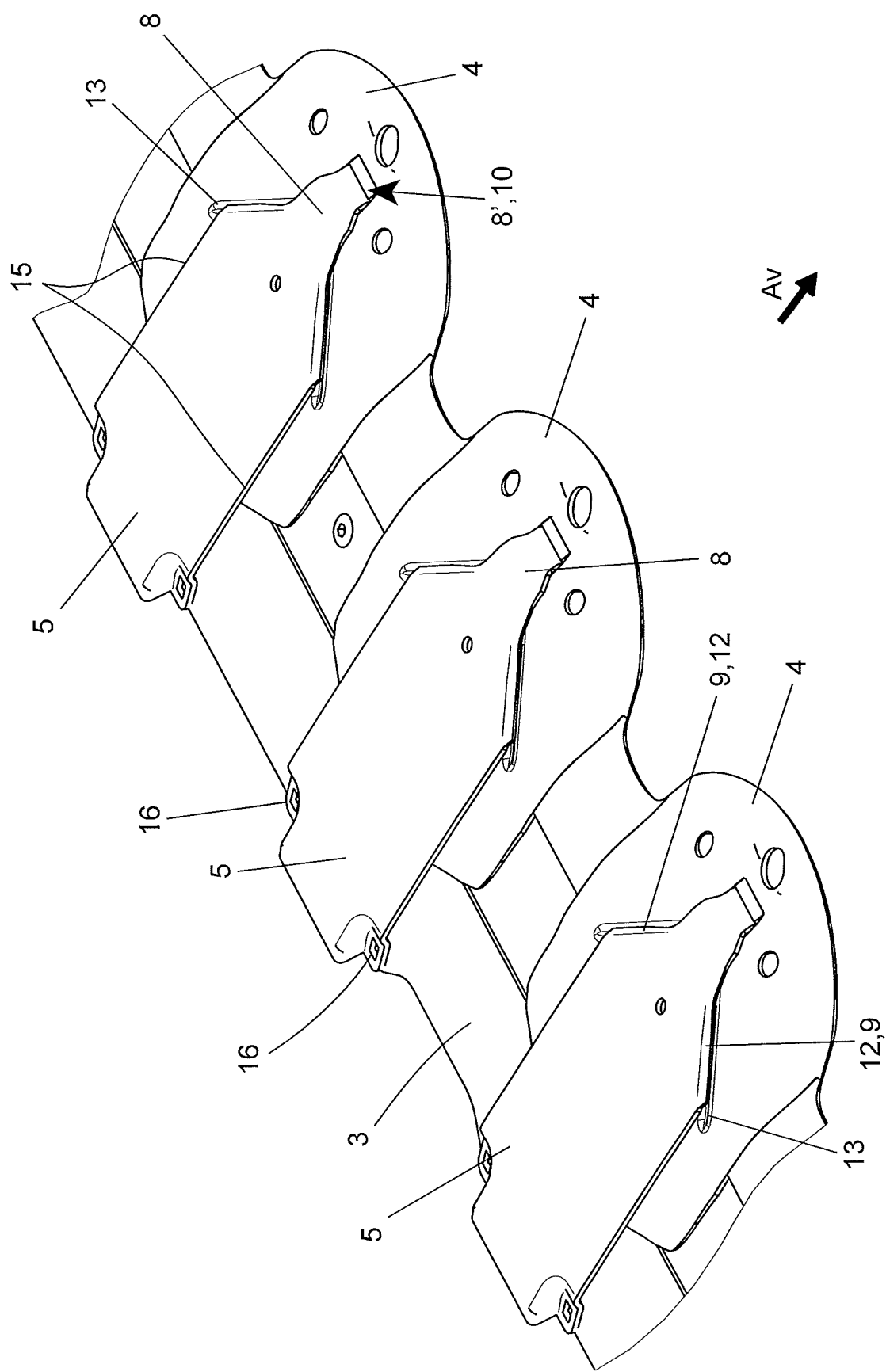
FIG. 2 is a partial view in perspective, from below, of the cutter bar forming part of the machine represented in FIG. 1.

FIG. 1, and partly FIGS. 2 to 9, illustrate an agricultural machine 1 (more particularly a disk mower here) with a working element 2 provided in the region of its lower wall 3 with skids 4.

These skids 4 are formed in the lower wall 3 of the said working element 2 or are rigidly integral therewith, and they constitute protruding bracing zones, wherein each skid 4 is provided with a wearing part 5 forming a liner and being attached to skid 4 (on the lower face thereof).

Each liner 5 has at least one frontal end 8 and frontal rims 9 (with a frontal rim 9 on both sides of the end or of each frontal end 8).

According to the invention, at least one frontal rim 9 of liner 5, preferably both, has or have a relief 12, at least one part of which penetrates into an indentation 13 formed in the corresponding skid 4.

Frontal rims 9, which are situated on both sides of the end or of each frontal end 8, are preferably visible on a front view of liner 5 (not shown). Each liner 5 may comprise a front part 7, terminated by one or more frontal ends 8, a rear part 7' and a central part 7" constituting the body of the said liner 5, wherein this body preferably has one (or more) square or rectangular shapes (see FIGS. 6A and 6B). An intermediate zone 14 connects frontal end 8 under consideration to body 7" of liner 5. Thus a frontal rim 9 connects a rim of end 8 to a lateral rim 15 of body 7" of liner 5, directly or indirectly. When several frontal ends 8 are present, one frontal rim 9 may also connect two ends 8 (see FIG. 7A).

Thus the invention proposes a solution for protecting skids 4 of an agricultural machine 1 of the type alluded to in the introduction, wherein the underside of lower wall 3 of working element 2 has a smoother profile, preferably devoid of any discontinuity, abrupt step, projecting ridge or noteworthy shoulder between protective liner 5 and the associated skid 4, thus greatly reducing the resistance to movement during forward travel of agricultural machine 1 braced at least partly on the soil by way of skids 4. The transition between the frontal uncovered zones of each skid 4 and protective liner 5 is smooth.

By proposing to round off the majority of the front rim of front part 7 of components 5 forming liners, in the manner of a ski tip, and by embedding at least one portion of the thickness of the said liners 5 in a hollow seat machined into the wall of skids 4, the invention permits these liners 5, while effectively protecting skids 4 by constituting interchangeable wearing soles for these said skids, which are exposed to the most severe stresses during use, to merge substantially into the outer shape of the said skids 4 and consequently to avoid negatively influencing the sliding action, and even to favor it.

Advantageously, the width of the end or of each frontal end 8 of liner 5 is smaller than the maximum width of liner 5, so that this or each end 8 has a shape tapered in the direction of forward travel Av of machine 1 during use.

Because of this fact, liner 5 may be fixed to the front of skid 4 without excessively adding weight to agricultural machine 1, while permitting it to distribute its weight over a maximum surface area. In addition, although skid 4 has a curved shape at the front (in front view), liner 5 does not have to match this shape, thus facilitating construction thereof.

In a preferred embodiment, liner 5 has its maximum width in the region of body 7".

According to a preferred embodiment, each relief 12 is formed by upward curvature, at least partly, of the corresponding frontal rim 9.

Such a design makes it easy to form relief 12 of frontal rims 9 of liner 5 at less cost. Alternatively, reliefs 12 may also be formed by ribs or thickened portions of similar material, or even by one or more supplementary components attached between liner 5 and skid 4.

In a preferred embodiment, relief 12 of liner 5 penetrates into indentation 13 of skid 4 over the entire length of relief 12.

According to an advantageous practical structural variant of the aforesaid embodiment, each frontal rim 9 forms an angle α with the direction of forward travel Av, for example of between 30 and 60 degrees, preferably between 40 and 50 degrees.

Figure 7B:
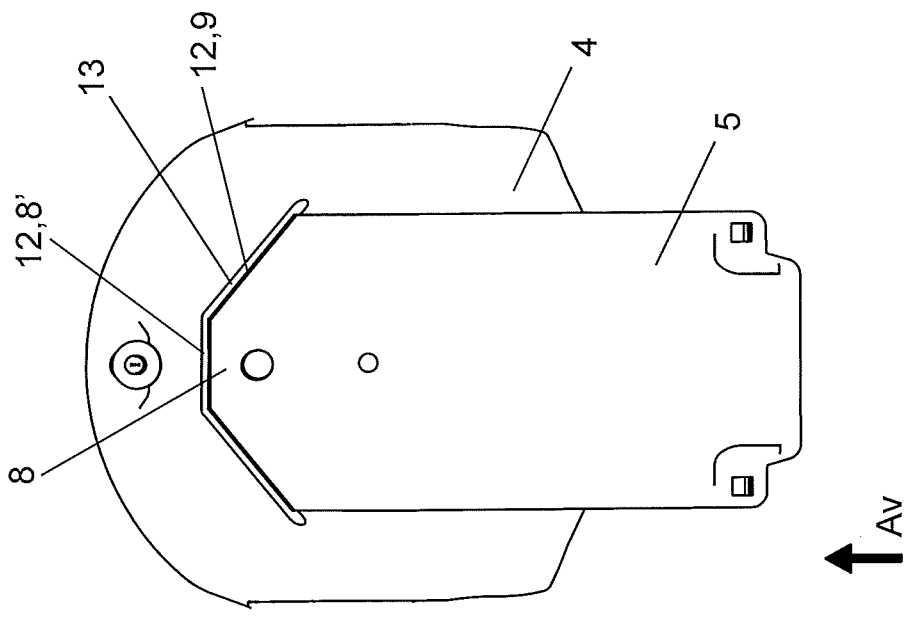
FIGS. 7A and 7B are views, from below, illustrating two other alternative embodiments of a skid/liner assembly, more particularly the frontal assembly between a skid and its liner.
Figure 7A:
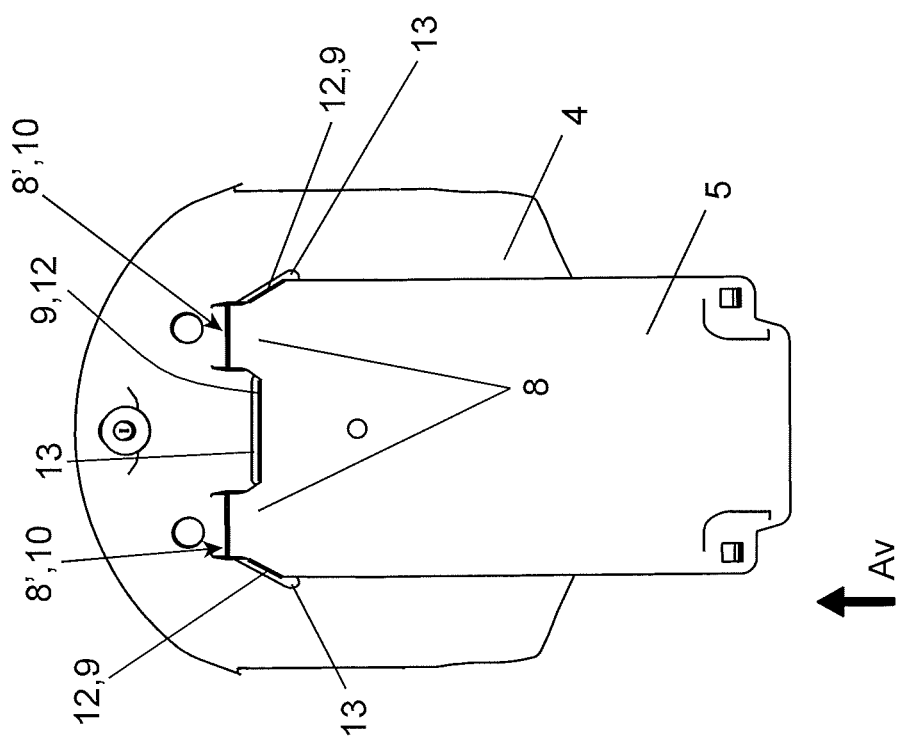

As is apparent from FIG. 7A, a frontal rim 9 or one of the frontal rims 9 may alternatively form an angle α of 90 degrees with the direction of forward travel Av, in particular a rim 9 extending between two frontal ends 8.

Figure 6B:
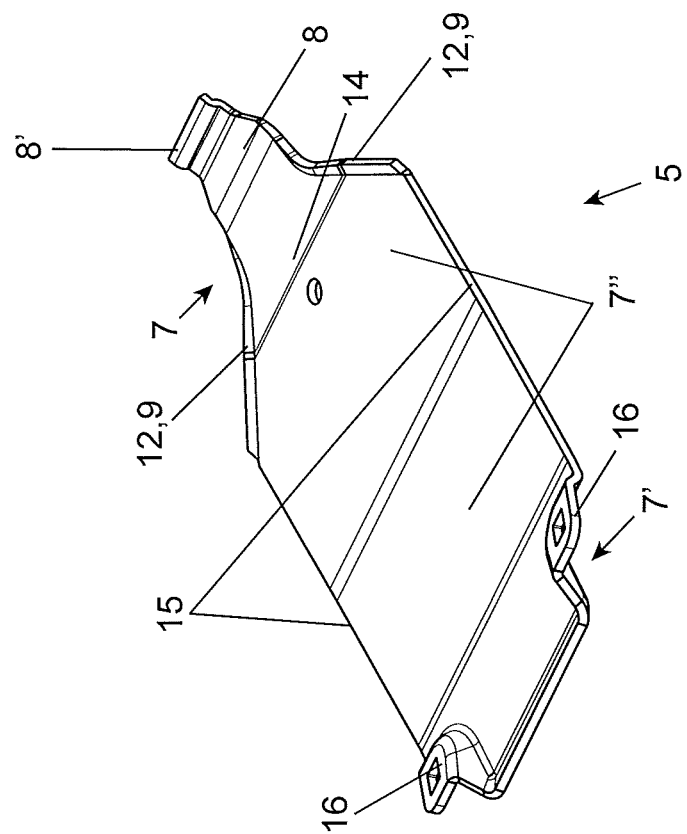
FIGS. 6A and 6B are views in perspective, from below and from above respectively, of a liner represented in FIGS. 1, 2, 3 and 4 and adapted for mounting on the skid represented in FIGS. 5A and 5B.
Figure 6A:
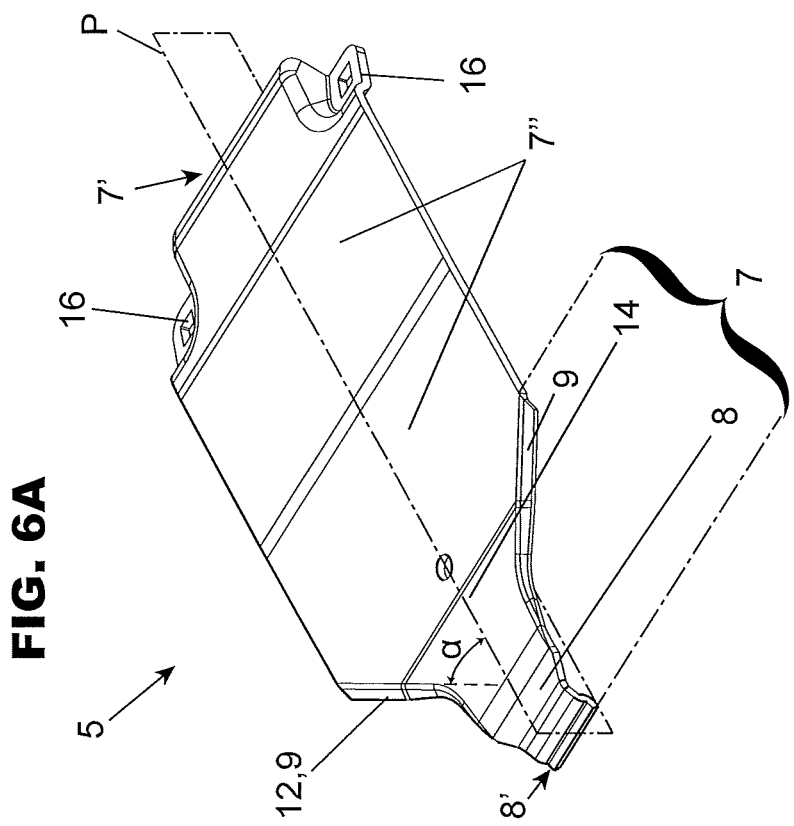

According to another advantageous structural characteristic of the invention, as is evident in particular in FIGS. 1 and 6A, each liner 5 has a symmetry plane P, which is vertically oriented (i.e. perpendicular to the plane of body 7", braced on the soil by surface contact during use) and parallel to a direction of forward travel Av, and frontal rims 9 (or at least some thereof) are disposed between the legs of a V open toward the rear and arranged symmetrically relative to the symmetry plane associated with liner 5 (FIG. 6B). This virtual V has an angle of 2α between its two legs.

Such a construction contributes to evacuation, toward the rear, of the earth and debris encountered during forward travel while being braced on the soil, and it favors sliding of agricultural machine 1 on the vegetation cover while minimizing deterioration thereof due the passage of machine 1.

It can be seen that the Y-shaped form of front part 7 (formed by 8+14) and the V-shaped arrangement of reliefs 12 (mirroring rims 9) favor the evacuation, toward the side and toward the rear, of the heaps of earth, debris or analogous matter encountered during forward travel of machine 1 while being braced on skid 4 and/or liner 5.

According to an alternative embodiment, not shown, frontal rims 9 extending on both sides of frontal end 8 of liner 5 may be rounded (in view from above).

According to another alternative embodiment, shown in FIG. 7A, liner 5 may have two (or more) frontal ends 8, between which one or more frontal rims 9 extend.

Figure 4:
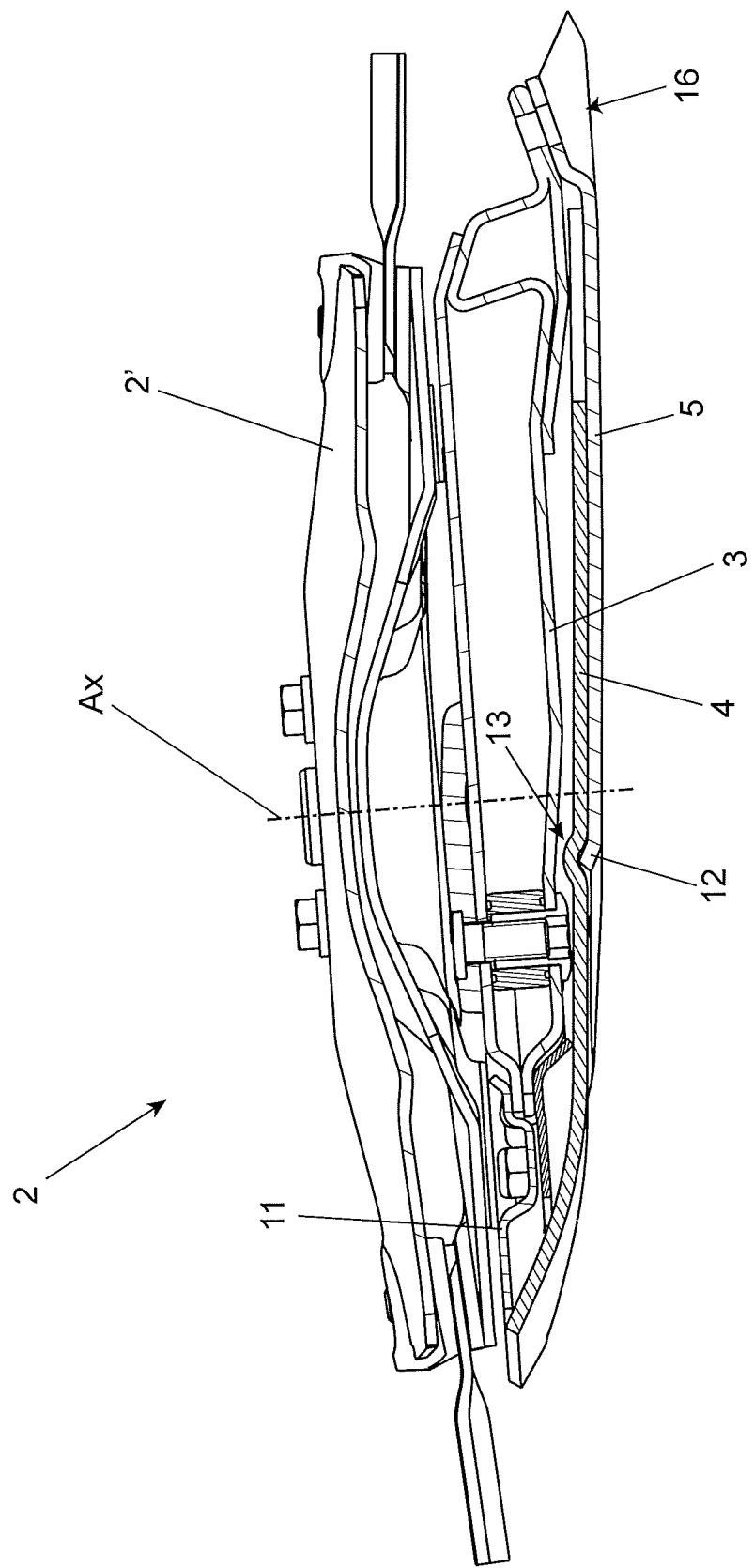

According to a preferred embodiment of the invention, indentations 13 formed in each skid 4 (provided with a liner 5) are non-through grooves (see FIGS. 4, 5 and 8).

The advantage of blind or non-through indentations 13, bosses or analogous reinforced zones, is that earth cannot penetrate into the space between skid 4 and working element 2. However, the invention does not exclude the formation, in skid 4, of indentations 13 in the form of slots passing completely through the thickness of skid 4.

Preferably, working element 2 is a cutter bar and machine 1 consists of a disk mower with axes of rotation Ax that are substantially vertical or inclined slightly toward the front. This mower is provided with a casing of at least two parts, wherein the lower part is constituted by lower wall 3 provided with skids 4. In addition, symmetry plane P of each liner 5 includes axis of rotation Ax of disk 2' associated with skid 4.

Agricultural machine 1 in the form of a mower, and also cutter bar 2 may be, for example, of the same type as those described in French Patent Applications No. 16 70280 and No. 16 70281 in the name of the Applicant.

According to one characteristic of the preferred embodiment of the invention, each liner 5 is assembled rigidly with the corresponding skid 4 and/or working element 2.

According to an alternative embodiment, lateral rims 15 of liner 5 each have a relief 15', at least one part of which penetrates into indentations 13' formed in skid 4.

Advantageously, the portion of frontal end 8 of the part forming liner 5 has curvature substantially similar to that of the frontal part of the corresponding skid 4, wherein frontal end 8 of the said component forming liner 5 is advantageously assembled with the said skid 4 by mechanical engagement, for example by catch action. This assembly is advantageously blocked and interlocked by a second screwed coupling or by an analogous removable fixation means, preferably in the region of a rear part 7' of the component forming liner 5.

Such an embodiment favors both a reduction of the resistance to movement of skids 4 and the speed of execution of the operations of mounting/demounting of components 5 forming liners.

According to an embodiment of the invention shown in FIGS. 2 to 4 and 6, front part 7 of each component forming liner 5, in the form of a plate, has a tapered shape terminated by at least one tongue-shaped frontal end 8, the free rim zone or terminal portion 8' of which is shaped to be engaged by catch action in an opening 10 of skid 4.

Nevertheless, frontal end 8 of liner 5 may also be assembled on skid 4 by other means, for example coupling by screw connection.

Figure 3:
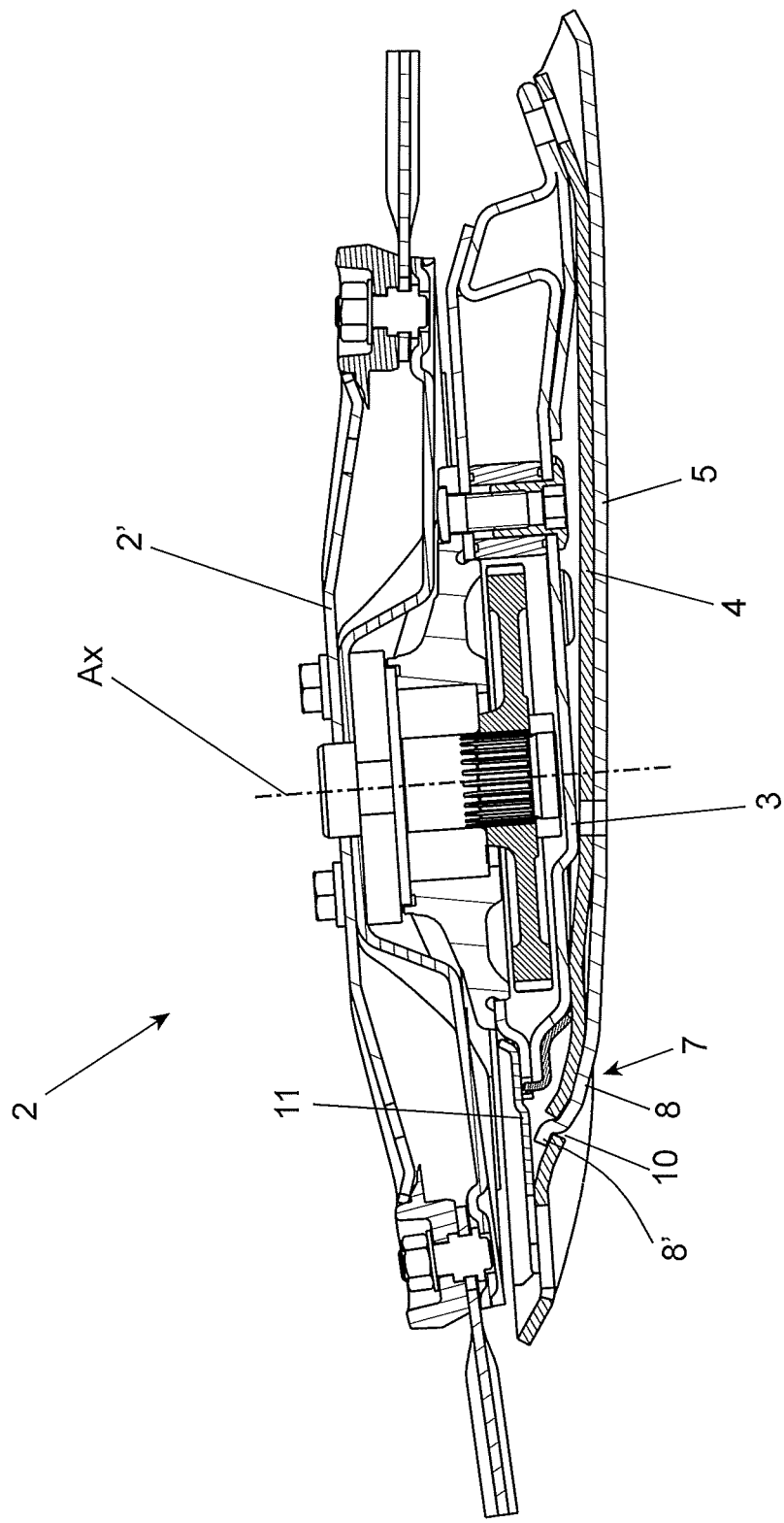
FIGS. 3 and 4 are views in section, along A-A and B-B respectively, of the object presented in FIG. 1.

Nevertheless, the end or each frontal end 8 of each liner 5 advantageously consists in an upwardly curved tongue, the terminal portion 8' of which is shaped to engage by catch action in an opening or notch 10 of lower wall 3 and/or of corresponding skid 4 (FIGS. 3, 4 and 7).

Preferably, the frontal connection of each liner 5 with the corresponding skid 4 and/or lower wall 3 by catch action, and therefore the mounting of each liner 5 in the region of the corresponding skid 4, is interlocked and blocked in position by at least one screw coupling, preferably in the region of screwed fixation sites 16 situated opposite front end 8 of liner 5 under consideration.

According to an advantageous practical structural variant of the aforesaid embodiment, the or each terminal portion 8' may be structured substantially in S-shape (FIGS. 3 and 6), wherein opening 10 in skid 4 in question consists advantageously of a slit. An interlocking structure 11 present on skid 4 and/or lower wall 3 and providing automatic blocking in position of the said terminal portion 8' in opening 10 in the mounted state of the said part forming liner 5 is preferably associated with this slit 10.

Structure 11 may consist, for example of a wing, which is attached to the inside face of the skid 4 in question and which forms a blocking counter-stop for the terminal portion 8' for assembly of frontal end 8.

Nevertheless, other structures of the zone or portion 8' are possible for achieving catch action, such as, for example, a simple fold of liner 5.

In this preferred embodiment of the invention, which is shown in the attached figures, component 5 provides a protruding protective screen, which covers the major part of the lower face of the plate forming the skid 4 under consideration, particularly the regions of skid 4 that are most exposed to stresses and to wear when casing 2 is displaced slidingly in a manner braced on the soil. Only two frontal regions of skid 4, which are situated on both sides of front portion 7 of attached part 5 and are less exposed, are not covered.

Preferably, and in order to culminate in a larger bracing surface area, the component forming liner 5 extends toward the rear and beyond skid 4 on which it is mounted, while being rigidly integral therewith, for example, by way of screwed fixation sites 16 or analogous means, machined into the bracing pads or feet, preferably made in one piece in the body of the said component 5.

Liner 5 may be attached on skid 4 in such a way as to be pressed against it, as shown in FIGS. 3, 4 and 10A. Alternatively, depending on the tasks to be performed by agricultural machine 1 or on the circumstances of mounting or use thereof, it may be provided, as shown in FIG. 10B, that the outer bracing surface of the component forming liner 5 is inclined relative to the lower face of the skid 4 on which it is mounted, for example by virtue of a variable thickness of the wall of the body of the said component 5 or of insertion of shims (not shown) between the said component and the said skid 4, this in order to be able to modify the nominal spreading angle.

Regardless of the inclination of attached liner 5 relative to skid 4, the penetration of reliefs 12 into indentations 13 is maintained.

Advantageously, and especially for reasons of ease of manufacture and of retail cost, indentation 6 illustrated in FIGS. 5A and 5B and forming a seat for frontal end 8 at least of liner 5 consists in a deep-drawn zone of the plate or sheet of the skid 4 in question.

According to an alternative embodiment of the frontal assembly shown in FIG. 7A, frontal end 8 of liner 5 may have a double structure with an intermediate frontal rim 9 that penetrates into an indentation 13 formed in skid 4. In this variant, the said frontal end 8 may have two terminal portions 8' that penetrate engagingly into corresponding openings 10 adapted to skid 4 (see FIG. 7A).

According to another alternative embodiment, shown in FIG. 7B, terminal portion 8' also has a relief 12, at least one part of which penetrates into an indentation 13 formed in the corresponding skid 4.

As is shown more particularly in FIG. 6 of the attached drawings, the present invention also relates to an interchangeable liner 5 for skid 4 of an agricultural machine 1 such as described in the foregoing, wherein this liner 5 consists of an interchangeable wearing component. This liner preferably has the form of a shaped metal plate, with frontal rims 9 provided with reliefs 12.

As is shown more particularly in FIG. 5 of the attached drawings, the present invention also relates to an interchangeable skid 4 for an agricultural machine 1 such as described in the foregoing, wherein this skid 4 consists of an interchangeable wearing component and has indentations 13 for receiving at least partly, by engagement or nesting, reliefs 12 of a liner 5 such as described in the foregoing.

Of course, the invention is not limited to the embodiments described and represented in the attached drawings. Modifications are still possible especially from the viewpoint of the constitution of the various elements or by substitution of equivalent techniques, without departing from the scope of protection of the invention.

The invention claimed is:

1. An agricultural machine that rests at least partly in braced manner on soil during use and comprising:
   a working element and skids designed to slide on the soil, wherein the skids are formed in a lower wall of said working element or are integral with said lower wall, and each skid is provided with a liner having at least one frontal end and a frontal rim on each side of said frontal end, wherein each frontal rim forms an angle α with respect to a normal direction of forward travel of the machine during use, and
   wherein each frontal rim formed at an angle and provided along each side of the frontal end has a relief, at least one part of the relief penetrates into a respective at least one indentation formed in the corresponding skid.

2. The agricultural machine according to claim 1, wherein a width of each of said at least one frontal end of each liner is smaller than a maximum width of said liner.

3. The agricultural machine according to claim 1, wherein each relief is formed by an upward curvature, at least partly, of the corresponding frontal rim.

4. The agricultural machine according to claim 1, wherein each liner has a symmetry plane oriented vertically and parallel to a direction of forward travel of the machine during use, and the frontal rims of each said liner are disposed in a V shaped arrangement opening toward a rear of the agricultural machine and arranged symmetrically relative to the symmetry plane associated with the respective liner.

5. The agricultural machine according to claim 4, further comprising:
   a disk mower with axes of rotation that are substantially vertical or inclined slightly toward a front of the agricultural machine, with a cutter bar constituting the working element and provided with a casing of at least two parts,
   wherein a lower part of the at least two parts is constituted by the lower wall provided with the skids and the symmetry plane of each liner includes the axis of rotation of the disk mower associated with the corresponding skid.

6. The agricultural machine according to claim 1, wherein the at least one indentation formed in each skid are non-through grooves.

7. The agricultural machine according to claim 1, wherein each liner is assembled rigidly with the corresponding skid and/or the working element.

8. The agricultural machine according to claim 1, wherein each of said at least one frontal end of each liner includes an upwardly curved tongue, a terminal portion of each said upwardly curved tongue is shaped to engage by catch action in an opening or notch of the lower wall and/or of the corresponding skid.

9. The agricultural machine according to claim 8, wherein a frontal connection of each liner with the corresponding skid and/or the lower wall by catch action, and therefore a mounting of each liner in a region of the corresponding skid, is interlocked and blocked in position by at least one screw coupling.

10. The agricultural machine according to claim 9, wherein the at least one screw coupling, is in a region of screwed fixation sites situated opposite the frontal end of each said liner.

11. The agricultural machine according to claim 9, wherein each terminal portion of each of said at least one front end is structured substantially in S-shape, the opening or notch for each corresponding terminal portion includes a slit, and an interlocking structure associated with said slit is present on each of the respective skid in question and/or the lower wall.

12. The agricultural machine according to claim 1, wherein each said liner further comprises lateral rims, each lateral rim having a relief, at least one part of each said relief penetrates into the indentations formed in the corresponding skid.

13. The agricultural machine according to claim 1, wherein the agricultural machine is a disk mower or a swather.

14. An interchangeable liner for skids of an agricultural machine that rests at least partly in braced manner on soil during use, the agricultural machine including the skids and a working element designed to slide on the soil, wherein the skids are formed in a lower wall of said working element or are integral with said lower wall, each of the skids is provided with the interchangeable liner, the interchangeable liner comprising:
   an interchangeable wearing component with a frontal end and a frontal rim situated on each side of the frontal end, wherein each frontal run forms an angle α with respect to a normal direction of forward travel of the machine during use,
   wherein at least one of the frontal rims has a relief designed to penetrate into a respective at least one indentation of a corresponding skid.

15. The interchangeable liner according to claim 14, wherein the interchangeable wearing component is a shaped metal plate.

16. A skid for the agricultural machine that rests at least partly in braced manner on soil during use, the agricultural machine includes the skid and a working element designed to slide on the soil, the skid comprising:
   an interchangeable wearing component with indentations for receiving at least partly, by engagement of nesting, reliefs of a liner,
   wherein the skids is formed in a lower wall of said working element or is integral with said lower wall, the skid is provided with the liner,
   wherein the liner has at least one frontal end and a frontal rim on each side of said frontal end, wherein each frontal rim forms an angle α with respect to a normal direction of forward travel of the machine during use, and
   wherein each frontal rim formed at an angle and provided along each side of the frontal end has the relief, at least one part of the relief penetrates into a respective at least one indentation formed in the skid.

\* \* \* \* \*